United States Patent Office 3,439,507
Patented Apr. 22, 1969

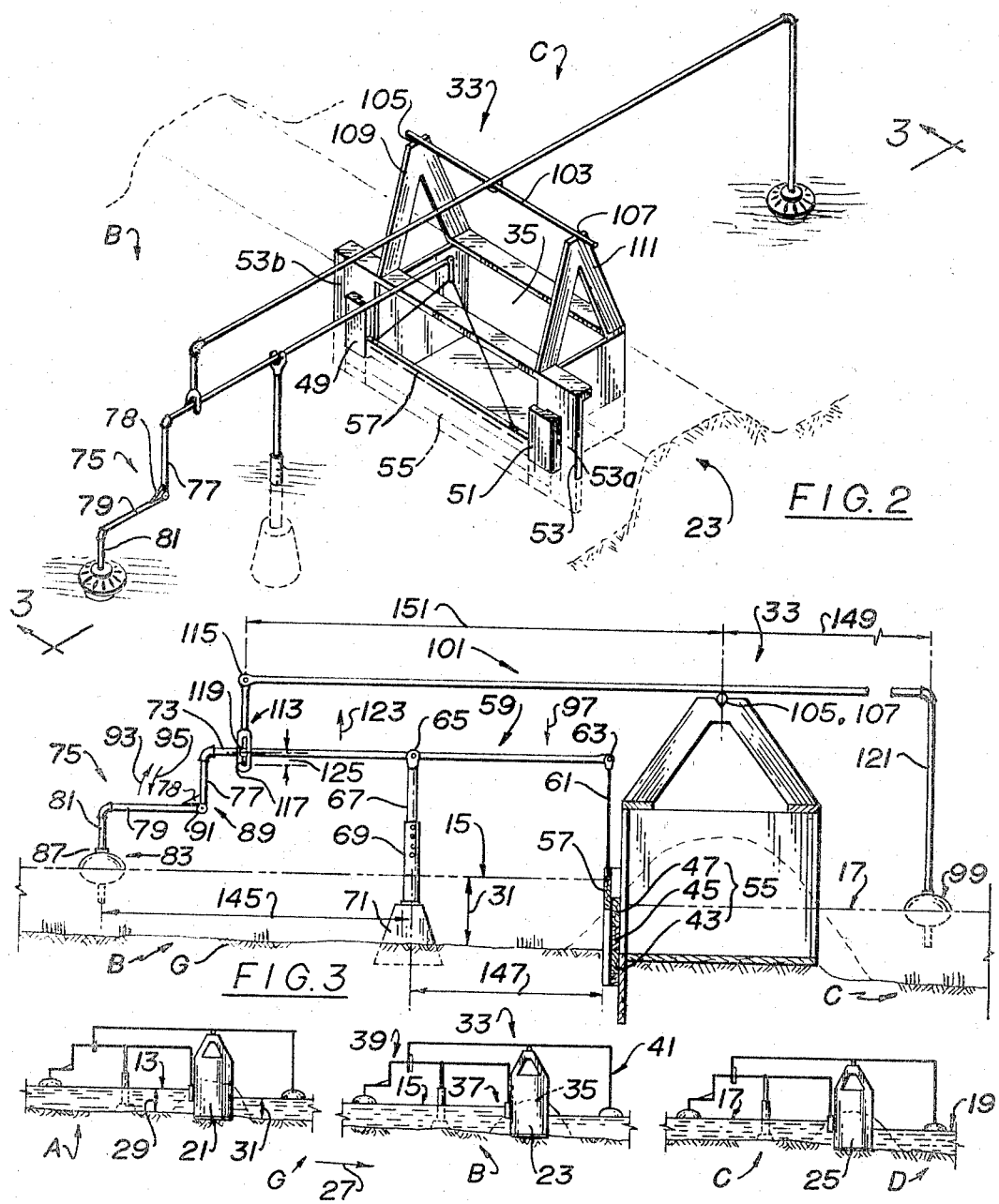

3,439,507
METHOD AND APPARATUS FOR IRRIGATION CONTROL
James R. Shaw, 15 Beaconsfield Court, Orinda, Calif. 94563
Filed Apr. 22, 1966, Ser. No. 544,436
Int. Cl. E02b 7/36
U.S. Cl. 61—28                    3 Claims

ABSTRACT OF THE DISCLOSURE

A system for regulating the liquid level differential between adjacent ponds in a series of such ponds including a sluice box for fluid flow between the ponds and an adjustable gate secured to the sluice box to block variably the channel thereof and cause different amounts of liquid to flow therebetween, the adjustable gate height being raised or lowered to achieve the aforementioned desired effect by means of a linkage arm and fulcrums actuated by floats associated with each of the ponds being controlled.

---

It is sometimes necessary and desirable to maintain a given liquid level in each of a series of adjacent water ponds or the like which are in flow communication with each other. Such ponds may, for example, be supplied with water from a common source which flows into the first pond, spills over from the first into the next pond, and so on, successively, through the entire system. A typical application of this type of water pond system may be found in the growing of certain kinds of crops, such as rice.

Water from a relatively given constant source is introduced into one irrigation pond or check whose floor is at the highest elevation until a desired height of water liquid level is achieved. Additional water entering the pond from the source is discharged to the next lower adjacent irrigation pond through one or more sluice boxes located in the earthern barrier separating the one pond from another.

Conventional sluice boxes are normally used as above described with means to control the liquid level in the pond whose water flow discharges therethrough. In this way water can be kept in continuous circulation over the land under cultivation, a requirement to prevent stagnation which could harm the crop being cultivated, while maintaining the liquid level in each of several ponds at the necessary predetermined height. Normally the means employed to achieve such liquid level control with conventional sluice boxes consists of gates made up of a series of boards or slats disposed transversely across the channels of the sluice boxes. Such grades require manual adjustment initially to determine the maximum height of water backed up behind the gate into the rice check immediately upstream therefrom. As the water continues to flow into the pond, it overflows the lip of the uppermost portion of the gate and spills into the adjacent downstream check. In this manner an entire array or series of checks is flooded to predetermined levels controlled by the initial setting of the adjustable gates within the several sluice boxes employed.

It is usually necessary to maintain a differential water level between adjacent rice checks of about three or so inches, depending upon various operating requirements and the desired depth of water in each of the successive ponds. For proper growth and operation of the crop to be harvested, such differential levels should be maintained within relatively close tolerances, in the order of magnitude of not more than about an inch. Failure so to do over a period of even as little as a few hours may result in deleterious effects to the crops, as mentioned above, which may destroy or greatly reduce the yield from any one pond or series of ponds.

In the present operation of rice checks and the like, as described above, it is necessary to maintain almost constant vigilance over the areas under irrigation to make certain that the desired water levels and constant circulation of water from upstream to downstream ponds is maintained. However, due to differences in the rate of absorption of water into the earth's surface from one immediate region to another; differences of evaporation due to differences of exposure from one portion of the cultivated and flooded area to another; and differences of water seepage through the various earthen barriers erected to form the ponds under cultivation, water levels in each of the several ponds tend to change after initial setting of the adjustable gates in the several sluice boxes. Such change not only requires surveilance to be detected promptly, but extensive manual adjustment of the various sluice box gates in order to reestablish the required differential water levels is usually then required.

Even with round-the-clock crews maintaining watch over a given area under cultivation, it is relatively difficult to reestablish the critical liquid levels in each of the ponds once one of them fluctuates from its predetermined and desired depth. For example, to compensate for an increase or decrease in water level in one pond alone, it is necessary to alter the gates in each of the sluice boxes upstream or downstream from such pond. Then, after readjustment is made, it is necessary to go back and once again reset all of the gates in the various sluice boxes affected. Such operations in and of themselves are costly and time consuming even when performed before crop damage occurs. Sometimes, especially if the liquid level fluctuates during the night, the difficulty in observing water levels over a vast acreage employed in rice growing results in portions of the crop being diminished or lost altogether.

Thus it is an object of the present invention to provide a system for regulating the liquid level and differential between adjacent ponds in a series of such ponds, each pair of adjacent ponds comprising an upstream pond having a first predetermined liquid level and a downstream pond having a second predetermined liquid level lower than the first.

A feature and an advantage of this invention is that by restoring the desired differential liquid level between adjacent irrigation ponds automatically by means of my invention, prompt reestablishment of critical water levels is achieved thereby preventing crop loss; and the amount of manpower required to maintain such areas under cultivation is greatly reduced.

A further feature and an advantage of this invention is that the automatic adjustment of the differential liquid levels functions at all times thereby minimizing the need for maintaining crews around the clock.

It is further an object of this invention to provide a method for regulating the liquid level and differential between adjacent ponds comprising the steps of first sensing a change in the liquid level of one of the ponds; transmitting by the step of sensing a force impulse proportional to the changed liquid level from the liquid level of the one pond to the adjacent pond; and then forcing water from the adjacent pond in accordance with the force impulse from the one pond to alter the flow of water between one of the ponds adjacent thereto and the one pond.

It is a further object of this invention to provide the aforementioned method wherein the change in liquid level in the one pond is in the direction of increasing the height of the liquid level and, in the step of positioning, to increase the flow of water from the one pond to the pond downstream thereto.

It is also an object of this invention to provide the aforementioned method wherein the change in liquid level in the one pond is in the direction of decreasing the height of liquid level and, in the step of positioning, to increase the flow of liquid from the one pond upstream thereto to the one pond.

Turning now to the drawing, FIG. 1 is a sectional elevation, partly in schematic form, showing my invention as applied to portions of four adjacent irrigation ponds;

FIG. 2 is an isometric view showing my invention incorporated with one sluice box between adjacent upstream and downstream irrigation ponds; and FIG. 3 is a sectional elevation taken along line 3—3 in FIG. 2.

Briefly stated, my invention embraces apparatus to provide a system for regulating the liquid level within, and differential liquid levels between, adjacent ponds in a series of such ponds, for example those indicated at A, B, C and D, in FIG. 1, each of said ponds being adapted for fluid communication with each other and provided to have a different liquid levels as designated by the position of surface markers 13, 15, 17 and 19, respectively. The ponds themselves are separated by means of earthen barriers 21, 23 and 25 erected upon the generally sloping terrain G, having a fall line generally descending in the direction of arrow 27. The barriers shown in section in the figure generally follow along contours of the terrain, while other barriers (not shown) which form the other sides of the ponds follow along fall lines of the terrain G. Each successive liquid level 13, 15, 17, 19 is in stepped relation to the next liquid level of the next adjacent pond; and each pair of ponds comprises an upstream pond having a first predetermined liquid level, such as that exemplified by dimension 29 for the pond at A, and a downstream pond having a second predetermined liquid level lower than the first, exemplified by dimension 31 of the pond at B.

The regulating system of my invention embraces the sluice box at 33 between ponds indicated at B and C, and is typical of the other two sluice boxes shown in FIG. 1. Henceforth in this specification enumeration of specific components will be related to the sluice box indicated at 33 and the components associated therewith in the ponds indicated at B and C, it being understood that substantially identical components cooperating together in substantially the same manner are provided between ponds A and B, and C and D, as will become apparent hereinafter.

The sluice box, usually made of wood or other suitable material, indicated at 33 is fabricated to form channel 35 therethrough which establishes fluid communication between upstream pond B and downstream pond C. An adjustable gate indicated at 37 is secured to the sluice box and may be positioned to variable block channel 35 in response to the fulcrum arm assembly indicated at 39 and the fulcrum bar assembly indicated at 41. More particularly, and as will be explained in greater detail hereinafter, if liquid level 15 should be elevated and the depth shown by dimension 31 increased, the adjustable gate at 37 may be automatically lowered to permit the excess water to be discharged into the pond at C. This in turn will increase liquid level 17 and the same procedure will be repeated, discharging water into the pond at D, which may eventually cause each pond downstream from the pond at B to receive and discharge additional water until the liquid levels and differential liquid levels of the entire system are reestablished at predetermined values.

Conversely, if the liquid level at 15 should fall below defined tolerances, the fulcrum bar assembly associated with the sluice box between ponds A and B, in all respects substantially similar to the box indicated at 41, will cause an increase of flow of water from ponds A to B, thereby tending to restore liquid level 15 to its predetermined level. In turn, as liquid level 13 in pond A falls, the sluice boxes of further upstream ponds will be readjusted by the apparatus of my invention and cause additional water to flow from each of the successive upstream ponds to reestablish the predetermined liquid levels. Eventually of course, under the latter circumstances, it may be necessary to readjust the amount of water being admitted into the initial and highest elevation pond, but the function of my invention virtually eliminates immediate attention of an operator who may then attend to readjustment of the water source at a relatively more convenient time. Subsequent readjustments that may be necessary when the flow from the water source is readjusted will automatically be compensated by my novel apparatus in the manner first generally described hereinabove for increase in the liquid level of an upstream pond.

To describe my invention in somewhat greater detail, I next refer to FIGS. 2 and 3, wherein my novel apparatus, shown between the ponds indicated at B and C in FIG. 1, is illustrated in greater detail. The sluice box indicated at 33 has various conventional details not further described herein but well illustrated in the drawing. The box is shown firmly planted in earthen embankment 23 and, at the time of initial setting of the various water levels in the ponds, boards 43, 45 and 47 are slipped between holders 49 and 51 and backstop 53 to provide the adjustable but relatively permanent transverse obstruction to sluice box channel 35. Collectively, plates 43, 45 and 47 are designated as splash plate 55.

Directly behind splash plate 55 I provide moveable plate 57 adjustably mounted in relatively watertight contact with one face of the splash plate. Moveable plate 57 may be fabricated of wood, plastic, metal or the like, and is shaped to span transversely across the upper portion of the sluice box channel unobstructed by splash plate 55 and shaped to span between wings 53a and 53b of backstop 53. In the figure, I do not show any particular sliding mount assembly; and I rely upon the water backedup by plate 57 to maintain the plate in close, relatively water-tight contact with splash plate 55. However, if necessary, conventional expedients may be employed to slideably secure moveable plate 57 against splash plate 55; but such mechanical details are not an inherent part of my invention and therefore not explained nor described in greater detail herein.

At the time of initial setting of the various sluice boxes and components of my invention, the combination of splash plate 55 and of moveable plate 57 is positioned and located so that water backed up by these elements into the pond shown at B (and to the other ponds by substantially similar apparatus) is at the predetermined liquid level indicated by dimension 31 between the surface of terrain G and the liquid level surface at 15. Additional water circulated into pond B from a common source (not shown) overflows the uppermost portion of plate 57 and flows down into the pond at C, filling that pond to a level commensurate with the setting of the splash plate and moveable plate in the next sluice box downstream therefrom between the ponds indicated at C and C.

Moveable plate 57 is connected to the fulcrum arm indicated at 59 by means of a suitable rigid yoke 61 fastened to the arm by means of a conventional pivot connection at 63, both the arm and yoke being fabricated from aluminum tubing, steel, or other suitable material. The fulcrum arm is pivotally supported by pin connection 65 at the upper end of column 67 which is adjustable in respect to height by virtue of its telescoping fit within cylinder 69 secured to pedestal 71. The upstream end 73 of the fulcrum bar at 59 has attached thereto the ⌐-shaped assembly indicated at 75 comprising vertical offset segment 77, horizontal bar 79 and float support 81.

A first hollow vessel, or upstream float, indicated at 83, is slideably secured to float stub 81 and positioned for flotation in the water of the upstream pond indicated at B. The float is provided with internal bore 87 which permits slideable adjustment of the float along the stub 81 to a desired position where it may then be secured relatively permanently by conventional means such as a lock nut and washer or the like. A "lost motion" connection is indicated at 89 and comprises a conventional pin connection 91 uniting the proximate ends of members 77 and 79. A triangular shaped plate 78 is welded or otherwise secured to member 77 such that if arm 79 is lifted and rotated upwardly in the direction of arrow 93, the fulcrum arm at 59 is rotated about pin 65; on the other hand, if arm 79 is rotated downwardly in the direction of arrow 95, no motion is transmitted to the fulcrum arm since bar 79 merely falls away from plate 78 rotating freely above pin connection 65.

Thus it can be seen from the aforedescribed fulcrum arm assembly, that as the liquid level in the upstream pond at B rises to exceed the depth dimension 31, the float at 83 rises on the surface thereof, rotating the entire upstream portion of the fulcrum arm in the direction of arrow 93 and the downstream portion in the direction of arrow 97. The fulcrum arm being connected to moveable plate 57 by means of yoke 61, the aforementioned rotation forces the moveable plate downwardly. With the lowering of moveable plate 57, the portion of the sluice channel formerly blocked by the plate is decreased and water is permitted to flow therethrough into the downstream pond at C. In this manner the liquid level in the pond at B tends to be restored to its former predetermined and desired level.

It is to be noted that in the aforementioned described action, wherein excess water from the pond at B is discharged into the pond at C, the level in the latter pond will rise causing a similar action as that described above to be imposed on its discharge sluice box and on successive downstream sluice boxes. In addition, as the water level in the pond at C rises, the second hollow vessel or downstream float indicated at 99, otherwise similar in all respects to the description heretofore given for the float at 83, rises. Float 83 is connected to the fulcrum bar indicated at 101 which is pivoted on rod 103 supported between notches 105, 107 in upright supports 109, 111. As float 83 rises due to the increase of liquid level in the pond at C, the motion of the fulcrum bar at 101 tends to lower the slotted connection indicated at 113 which is secured to the upstream end of the fulcrum bar by conventional pivot connection 115. The slotted or lost motion connection at 113 includes slot 117 that may be located in each fork of a bifurcated yoke in which there is slideably fitted stub 119 secured to the upstream end of the fulcrum arm at 59. As the upper end of slot 117 is lowered by the aforementioned increase in the height of float 99, any increased motion of the upstream and of the fulcrumed bar at 59 in the direction of arrow 93 is arrested by engagement of stub 119 in the upper blind end of slot 117. Thus additional water may not be discharged downstream from the pond at B to the pond C until water is discharged from the pond at C to the pond downstream therefrom, namely the pond at D, etc.

Referring again to FIG. 3, if the water level indicated by marker 17 should for reasons of absorption, evaporation or otherwise, begin to drop in elevation, float 99, by virtue of its immersion and attraction to the surface of the water by natural suction, will follow such drop in the liquid level. As the float continues to drop, lost motion connection 113 rises in the direction of arrow 123 relative to stub 119 secured to the upstream end of the fulcrum arm indicated at 59. As connection 113 continues to rise for at least a distance equal to dimension 125, the lower blind end of slot 117 contacts stub 119. With additional motion from continued descent of float 99, contact between slot 117 and stub 119 causes the upstream end of fulcrum bar 59 to move in the direction of arrow 93, thereby causing moveable plate 57 to be lowered. Upon such movement of plate 57, water from the pond at B may flow over the uppermost portion of the moveable plate and spill over into the pond at C, thereby tending to restore liquid elevation 17 to its former predetermined value. Simultaneously, as liquid level 15 at pond B drops due to the discharge of water into the pond at C, a sequence of events similar to that just described for the pond at C occurs at pond B causing an increase of water flow from pond A into pond B. Thus the increase in water flow from successive upstream ponds to a pond having a decline in its liquid level is commenced which tends to reestablish the predetermined liquid level and differentials.

It should be noted that when the liquid level in any pond tends to drop below its predetermined and desired level, the action of the upstream float, such as the one indicated at 83, has no effect on this system due to the action of the lost motion connection indicated at 89 and explained hereinabove. Also, as liquid levels fall in the various ponds, causing floats such as that indicated at 99 to move downwardly, no action is effectuated on the moveable gates to which they are linked until the liquid level has dropped a distance proportional to the dimension 125, about half the length of slot 117. It is to be noted that dimension 125 may be made any suitable value to provide the range of variation which may be tolerated in the liquid levels of any of the ponds for particular application such as rice crops, fishery ponds, and the like.

A significant aspect of my novel control system is its tendency to be "self-centering." That is, once one of the liquid levels in one of the ponds rises or falls, causing the aforedescribed sequence of events to restore the liquid level to its predetermined value, the system as a whole tends to seek its original equilibrium position. Exact physical theories for this phenomenon are beyond the scope of this specification; but this appears to be so because when the apparatus is originally set up with the upstream and downstream floats in preselected position in respect to the postioning of the moveable plate in the sluice box therebetween, the forces in the fulcrum arm and fulcrum bar appear to be in equilibrium. At any other position of the arm and bar, an unbalance appears to be present tending to move the system in the direction of its original equilibrium state. When the various water levels are restored to their original predetermined values, the system tends to remain in that condition until another unbalance in liquid levels occurs.

Although the foregoing specification describes a working embodiment of my invention, I have found it preferable to fabricate my novel apparatus in accordance with the following design details.

Pivot point 65 may be located at about the center of gravity of the fulcrum arm at 65; and this may be achieved, even where such point is not at the geometric center of the arm, by counter balancing the arm, e.g. by the use of different diameter stock on either side of the pivot point, counter balance weights, or other conventional means not shown on the drawing nor further described herein. Similarly, the pivot point established by rod 103 for the fulcrum bar at 101 is selected at about the center of gravity of the fulcrum bar. In this way the system is generally in balance before any floatation forces are imposed thereon, and in general makes my invention more sensitive to changes in liquid level and responses thereto.

Also, I have found it desirable to select dimension 145 to be such that the force produced at float 83 as the water rises thereupon need only be about in the magnitude of two to three pounds to overcome drag forces of from up to about 25 pounds produced by the friction between moveable plate 57 and the face of splash plate 55 with which it is in relatively watertight rubbing contact. Similarly, I prefer to select dimensions 149, 151 to generate similar amounts of force at the aforementioned interface between plates 57 and 55 when a force in the magnitude of about two to three pounds is produced at the float indicated at 99.

Although I have described my invention with one specific embodiment in mind, and although I believe the apparatus which I show and claim hereinafter to be novel and useful, it is to be noted that the method which I indicate for regulating differential level between irrigation ponds may be achieved by other means. For example, the mechanical linkage which I show to regulate the level of the movable plate 57 could be replaced by electrical apparatus wherein a fluctuation of water level in any two adjacent ponds may cause contacts in relatively fixed float devices to "make" or "break" which in turn could actuate electrical movers to increase or decrease the elevation of the moveable plate 57. Moreover, the movable plate could be replaced entirely by the use of an electric motor and pump feeding water from one pond to the other to restore predetermined liquid levels.

Also, it is understood that electrohydraulic means could be employed wherein a hydraulic mover may be used to effectuate movement of the movable plate 57 or actuate a pump to displace water from one pond to another.

In addition, it is understood that the entire sluice channel gate may be fabricated to open along a vertical median line and effectuate a swinging gate to vary the flow of water from an upstream to a downstream pond in lieu of the vertical gate movement which I show, although I prefer the latter. In addition, instead of a single moveable plate, the entire moveable plate and splash plate combination could be replaced by a louvered horizontal moveable gate controlled by linkage similar to that which I disclose in connection with the apparatus illustrated in the accompanying figure.

Thus it can be seen that my invention also embraces a system comprising a series of adjacent ponds adapted for fluid communication with each other through a sluice box having an adjustable gate for increasing and decreasing the channel for flow of the fluid therethrough from one adjacent pond to another, wherein each of the adjacent ponds has a different liquid level in stepped relationship to the next adjacent pond. Each pair of adjacent ponds, as shown in FIG. 1, comprises an upstream pond having a first predetermined liquid level and a downstream pond having a second predetermined liquid level lower than said first.

Also, my invention embraces the method for regulating the liquid levels within, and liquid level differentials between, adjacent ponds comprising the steps of (1) sensing a change of liquid level in one of the ponds; (2) transmitting, by the step of sensing, a force impulse proportional to the changed liquid level from the liquid level of the one pond to the pond adjacent thereto; and (3) forcing, in accordance with the magnitude of said force impulse, an amount of water to flow from said adjacent pond to the one pond to restore the liquid level of the one pond to its original value.

More speificially, the method of my invention may be exemplified in one embodiment by reference to FIG. 1. If, for example, the liquid level 15 in the pond indicated at B should begin to rise above the elevation indicated by dimension 31, my novel method comprises the steps of sensing such change and by said step of sensing, transmitting a force impulse proportional to the changed liquid level to the adjustable gate of the sluice box indicated at 33. Such force impulse positions the adjustable gate in accordance with the magnitude of such force to increase the channel of the sluice box for flow of fluid therethrough from the pond indicated at B to the pond downstream therefrom, the pond indicated at C. Conversely, where the liquid level at 15 were to drop thus diminishing dimension 31, a force impulse proportional to such drop would be transmitted to the sluice box between the pond is indicated at A and B increasing the channel of that sluice box for flow of a fluid therethrough from the upstream pond at A to the downstream pond at B, thereby restoring liquid level 15 to its original position.

As noted above, the novel method of my invention whereby each of the irrigation ponds tends to be restored to its original liquid level, hence preserving the differential liquid levels between ponds, may be accomplished by other means other than that exemplified by the novel apparatus of my invention explained in the specification hereinabove in greater detail.

Although I have explained my invention in some detail in the foregoing specification, this has been done with reference to a given embodiment primarily for purposes of illustration and clarity of explanation. It is understood that my invention, both in respect to the novel apparatus exemplified herein and the novel method for practicing liquid level control, may be embodied in numerous variations of the apparatus and method disclosed herein, all within the spirit of my invention and scope of the appended claims.

What I claim is:

1. In a system for regulating the liquid level differential between adjacent ponds in a series of such ponds adapted for fluid communication with each other, each pair of adjacent ponds comprising an upstream pond having a first predetermined liquid level and a downstream pond having a second predetermined liquid level lower than said first, and said system being of the type utilizing a sluce box having a channel therethrough for establishing fluid communication between each said upstream and downstream pond, the improvement comprising the combination of adjustable gate means including a splash plate secured to said sluice box and positioned to block a portion of the sluice channel establishing fluid communication between said upstream and downstream ponds, and to block variably said channel and cause the desired differential liquid level between said ponds to be maintained with the liquid level thereof at substantially said first and second predetermined liquid levels; means responsive to a change in said differential liquid level to adjust said adjustable gate means and variably block said channel to re-establish the differential liquid level, said last means including a first hollow vessel adapted for floatation in the water of said upstream pond, a moveable plate shaped to block a portion of the sluice channel proximate to said splash plate and adjustably mounted in relatively waterproof contact with one face of the splash plate for adjustable positioning to block variably said last portion of the sluice channel; a fulcrum arm having a first end connected to said moveable plate for positioning the plate in accordance with movement of said first hollow vessel, said fulcrum arm being pivotally supported at about the center thereof and in a generally horizontal position above said moveable plate and upstream liquid level; means connecting said second end of the fulcrum arm to said first hollow vessel to rotate the second end of the arm upwardly only about the pivot point of the arm in the direction causing said moveable plate to be positioned to decrease the portion of the sluice channel blocked thereby when the first hollow vessel is raised by an increase in the liquid level of said upstream pond, and alternatively, leave the arm unrotated when the liquid level in the upstream pond decreases; a second hollow vessel adapted for floatation in the water of said downstream pond; means connected to said fulcrum arm and said second hollow vessel to arrest motion of said fulcrum arm by said first hollow vessel when the liquid level of said downstream pond exceeds a preselected height, wherein last said means comprises a fulcrum bar having first and second ends, said bar being pivotally supported between said ends positioned generally horizontally with the first end connected to said second hollow vessel and the second end proximate the second end of said fulcrum arm; means connecting the second end of said bar to the second end of said arm to rotate the second end of the arm in a direction to cause unblocking of said sluice channel by said moveable gate when the liquid level in said downstream pond decreases, and arrest motion of said fulcrum arm when the liquid level of said downstream pond exceeds a preselected height, whereby an increase in the liquid level in one pond of said series tends to cause adjustment in said adjustable gate means downstream therefrom so as to in turn cause an increase in the flow of water downstream to each successive pond, and, alternatively, a decrease in the liquid level in one pond of said series tends to cause adjustment in the adjustable gate means upstream therefrom to cause an increase in the flow of water upstream therefrom on down to each successive pond to said one pond.

2. The improvement in accordance with claim 1 and wherein said fulcrum arm is shaped to have said center at about the center of gravity of the arm.

3. The improvement in accordance with claim 1 and means associated with said first and second hollow vessels to vary adjustably the attitude of said fulcrum arm with the first hollow vessel and the attitude of said fulcrum bar with the second hollow vessel.

References Cited

UNITED STATES PATENTS

| | | | |
|---|---|---|---|
| 850,703 | 4/1907 | Wesseley | 166—28 |
| 1,744,455 | 1/1930 | Duwe | 166—28 |
| 2,041,576 | 5/1936 | Suksdorf | 166—28 |
| 2,699,653 | 1/1955 | Ponsar | 166—28 |

FOREIGN PATENTS

| | | |
|---|---|---|
| 46,642 | 6/1929 | Norway. |
| 1,004,171 | 10/1951 | Norway. |

REINALDO P. MACHADO, *Primary Examiner.*